US012578512B2

(12) United States Patent
Jensen et al.

(10) Patent No.: US 12,578,512 B2
(45) Date of Patent: Mar. 17, 2026

(54) TEMPERATURE COMPENSATION FOR LIQUID LENS

(71) Applicant: HEXAGON TECHNOLOGY CENTER GMBH, Heerbrugg (CH)

(72) Inventors: Thomas Jensen, Rorschach (CH); Frank Przygodda, Lindau (DE); Johan Stigwall, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 143 days.

(21) Appl. No.: 17/991,418

(22) Filed: Nov. 21, 2022

(65) Prior Publication Data

US 2023/0160692 A1     May 25, 2023

(30) Foreign Application Priority Data

Nov. 22, 2021    (EP) .................................... 21209490

(51) Int. Cl.
*G02B 3/14*          (2006.01)
*G01B 11/00*         (2006.01)
(Continued)

(52) U.S. Cl.
CPC ............... *G02B 3/14* (2013.01); *G01B 11/005* (2013.01); *G01C 3/02* (2013.01); *G02B 7/028* (2013.01); *G02B 7/28* (2013.01)

(58) Field of Classification Search
CPC ........ G02B 26/004; G02B 3/14; G02B 7/008; G02B 7/028; G02B 7/08; G02B 7/36;
(Continued)

(56) References Cited

U.S. PATENT DOCUMENTS 11,209,576  B2    12/2021   Patscheider et al.
2007/0279757 A1   12/2007   Renders et al.
(Continued)

FOREIGN PATENT DOCUMENTS

CN         107797223  A      3/2018
CN         107850696  A      3/2018
(Continued)

OTHER PUBLICATIONS

Extended European Search Report dated May 16, 2022 as received in Application No. 21209490.8.
(Continued)

*Primary Examiner* — Christina A Riddle
(74) *Attorney, Agent, or Firm* — Maschoff Brennan

(57) ABSTRACT

Optical assembly comprising a variable focal length lens assembly comprising a variable focal length lens and an actuating unit, wherein an energy absorption rate of energy absorbed by the variable focal length lens assembly depends on the applied controlling signal. The optical assembly comprises a controlling unit configured to control focal length settings of the variable focal length lens by providing respective controlling signals and to apply a default controlling signal for providing a default focal length and default energy absorption rate. The controlling unit provides a thermal stabilisation functionality, the thermal stabilisation functionality is defined by applying a varying controlling signal related to a varying focal length and applying a compensation controlling signal related to a compensating focal length.

16 Claims, 3 Drawing Sheets

(51) Int. Cl.
  *G01C 3/02* (2006.01)
  *G02B 7/02* (2021.01)
  *G02B 7/28* (2021.01)

(58) Field of Classification Search
  CPC .......... G02B 7/28; G02B 26/005; G01C 3/02;
          G01C 25/00; G01C 15/00; G01B 11/005;
          H04N 23/56; H04N 23/67; H04N 23/673;
                                   H04N 23/69
  USPC ................ 359/665–667; 356/3–22, 614–624
  See application file for complete search history.

(56)                References Cited

U.S. PATENT DOCUMENTS

2017/0357035 A1* 12/2017 Nunnink ................ G02B 7/028
2020/0192006 A1   6/2020 Müller et al.

FOREIGN PATENT DOCUMENTS

| | | |
|---|---|---|
| CN | 111327815 A | 6/2020 |
| DE | 10 2017 119 517 A1 | 3/2018 |
| EP | 2 356 401 B1 | 8/2011 |
| EP | 3 668 082 A1 | 6/2020 |

OTHER PUBLICATIONS

CN Office Action dated Mar. 13, 2025 as received in Application No. 202211402475.4.

* cited by examiner

TEMPERATURE COMPENSATION FOR LIQUID LENS

BACKGROUND

The present disclosure generally pertains to a particular design of optics allowing to rapidly adapt probe properties regarding required measuring conditions and to provide stable measuring conditions, in particular used for measuring or surveying devices like a coordinate measuring machine (CMM) or a total station.

It is common practice to inspect work pieces subsequent to production on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probe or probing unit) carried by the probe head. Such probing unit can be designed as a tactile probe or an optical sensor providing measurements of surfaces e.g. based on the principle of triangulation or interferometry.

In a simple form of the machine a suitable transducer or linear encoder mounted parallel to each axis is able to determine the position of the probe head relative to a base of the machine and, therefore, to determine the coordinates of measurement points on the object being illuminated and/or imaged by the sensor. For providing movability of the probe head a typical coordinate measuring machine may comprise a frame structure on which the probe head is arranged and driving means for moving frame components of the frame structure relative to each other.

An advantage of using an (2D-)optical sensor is that contact with the part to be measured can be avoided and therefore a risk of potential deformations due to contact is low compared to a tactile probe.

However, the type of optical probe used for measuring a particular work piece has to be chosen in such a way that measuring properties of the probe fit to the shape or to topographic properties of the work piece. For instance, for measuring a borehole the probe may preferably comprise a prism or mirror to emit the measuring beam in a predefined angle, e.g. 90°, relative to an extension axis of the probe stylus. According to another example, optics may have to be changed depending on a desired measuring resolution or magnification.

For providing individually suitable properties frequent changing of a probe attached to the probe head of the CMM is typically necessary. Moreover, a number of specified probes for respective measuring requirements are to be available to guarantee precise measurement of different work pieces.

A coordinate measuring machine and a respective probe thus typically comprise an interface which allows to both mechanical and optical, in particular also electrical, coupling of the two components. By such interface the probe can comparatively quick and with low effort be attached to the probe head and carried and positioned by the probe head for measuring purpose. Such an optical-mechanical interface is for instance known from EP 2 356 401 B1.

As according to that approach the whole probe is to be exchanged when having deviating measuring requirements, the frequency of negative mechanical influences at the probe as well as at the CMM is quite high due to typical measuring conditions e.g. in industrial processes. Therefore, over-all lifetime of such probes and interfaces is quite limited.

SUMMARY

It is therefore an object to provide an improved probing system which allows fast and easy adaptation of the measuring conditions to demanded measuring requirements.

Another object is to provide a flexible CMM and probe design with respect to different work pieces to be measured.

Yet another object is to provide an improved adaptable measuring sensor which provides precise and reliable measuring conditions.

These objects are achieved by realising the features described herein. Features which further develop aspects in an alternative or advantageous manner are also described herein.

By making use of a variable focal length lens (tunable lens) to provide variation of its focal length as a function of an applied controlling signal. A force applied to the lens can be controlled by the controlling signal. A particular force provides respective deformation of the lens which results to variation of its optical properties and by that to a variation of its focal length.

The force may be generated by means of an actuator (e.g. voice coil or piezo) which applies defined pressure to the lens or by means of one or more electrodes which provide variable current and/or voltage. The lens may comprise an outer membrane which encloses one or more fluids. The fluids may provide variable optical and chemical properties (e.g. density) as functions of an applied current. For instance, a force may be provided to the lens by pressing on the membrane or by applying a current to the fluid.

FIGS. 2a and 2b show one example of a variable focal length lens which is capable of modifying its focal length. That embodiment of a variable focal length lens is described below in more detail.

The variable focal length lens may be embodied as a shape-changing lens. Such lens may consist or comprise of a container, which is filled with an optical fluid and sealed off with an elastic polymer membrane. The deflection of the lens is proportional to the pressure in the fluid. The lens can comprise an electromagnetic actuator (e.g. a voice coil) that is used to exert pressure on the container. Hence, the focal distance of the lens is controlled by the current flowing through the coil of the actuator.

The optical power of the variable focal length lens thus may increase with current. A starting point at zero current is set during production and can be varied from lens to lens. A slope of the optical power can be influenced by the mechanical properties of the membrane, which can also vary to provide different properties (e.g. ranges). The focal length also depends on temperature.

The present approach is preferably directed to make use of a variable focal length lens as mentioned in a coordinate measuring device like a coordinate measuring machine (CMM).

The approach also relates to multi-sensor CMMs that contain an imaging system (e.g. Hexagon Optiv machines). The imaging system typically comprises an objective lens and a camera. The CMM allows for an accurate positioning of the imaging system in x,y,z directions. The objective lens is preferable a telecentric lens so that the magnification is independent from the distance of the object to the objective lens. The CMM (typically the z-axis thereof) is used to bring the telecentric lens to the distance with respect to the object at which its image is in focus. This distance is also called working distance. It is a fixed distance and depends on the design of the lens optics (typically around 100 mm).

A tunable lens (variable focal length lens) makes it possible that the working distance becomes variable, e.g. between 80 mm and 100 mm Depending on the setting of the tunable lens, objects (or parts thereof) can be focused at different distances. Since the lens can change its focal length very quickly (<10 ms) the measuring process can be faster end more effective than the conventional way in which the mechanical CMM translation is used (typically the z-axis) to set a new focal plane.

For an accurate measurement of the x, y, z coordinates of object features (e.g. the surface of an object, its edges, or a bore hole), the feature can first be focused. Then the coordinates of the imaging system (moved by the CMM) and its working distance can be combined. In case of using a tunable lens also the focus setting are taken into account.

Therefore, the working distance may be calibrated as a function of the lens tuning signal (e.g. an electric voltage or current). The dependency can be a linear function or a higher degree polynomial, or a look-up table with interpolation for values between the values in the table. The calibration can be determined with a calibration artefact or with the CMM itself because it provides a well-defined displacement of the sensor (lens) with respect of the object.

The dependency of the working distance to the lens tuning (controlling) signal typically is (very) temperature sensitive. The temperature of the tunable lens is affected by the environmental temperature and in addition also by the energy absorption or power consumption of the lens itself. The actual power consumption mainly depends on the focus setting of the tunable lens. Because of this, the lens calibration preferably considers temperature conditions (individual calibrations for different temperatures). The temperature of the lens must therefore be known, preferably measured within or very close to the lens to reduce lag. Since the lens tuning signal in turn affects the temperature, the compensation is preferably provided in dynamic manner, forming a closed-loop control system.

When a controlling signal (lens tuning signal) changes, the lens typically changes its focus very fast (instantaneous reaction to force, typically some milliseconds). With the tuning signal (especially if this is a current) also the actual power consumption and therefore the temperature of the lens changes. This causes a subsequent drift of the focus (focus settling time, typically seconds to minutes). Since a temperature sensor is typically physically located away from the optical lens medium, the temperature measurement can only be accurate after a certain time (temperature sensing lag, typically seconds to minutes).

Both times constants are usually different so that the overall accuracy of the system is decreased even if the temperature is taken into account to compensate the temperature effects of the lens. FIG. 1 shows the drift of the working distance after the tuning signal was changed to achieve different focus distances. Although the measured temperature is taken into account (temperature dependent calibration of the focus), the actual working distance is drifting until the system is coming to a new thermal equilibrium (settling time ~2 minutes). During this period an accurate measurement is not possible.

The present disclosure relates to an approach for overcoming a settling effect as described above.

To overcome such settling effect after a change of the focus tuning, the lens can be operated continuously in a state with constant average energy or power consumption. When the lens focus is changed e.g. for a measurement this can be done quickly and with subsequent compensation of the power consumption, in particular immediately afterwards.

The disclosure relates to an optical assembly which comprises a variable focal length lens assembly. The variable focal length lens assembly comprises a variable focal length lens capable of modifying its focal length and an actuating unit configured and arranged relative to the variable focal length lens so that the actuating unit provides setting and varying the focal length as a function of a controlling signal. An energy absorption rate of energy absorbed by the variable focal length lens assembly depends on the applied controlling signal.

In context of the present disclosure energy absorption is in particular to be understood as any form and type of energy which is transferred to and/or absorbed by the variable focal length lens or the actuating unit, e.g. thermal energy generated by applying a current to an electric circuit. Such transmittal of energy to the variable focal length lens assembly typically results in a change of temperature or in providing a particular temperature level.

Energy absorption over a defined time period or duration can also be understood as respective power consumption of a particular component of the variable focal length lens assembly.

Moreover, the amount of energy absorbed per time unit or the power consumption depends on a respective rate of energy transmission or rate of energy absorption. That energy absorption rate may for instance be influenced by a temperature difference between to components or by a respective controlling signal applied to one of the components, i.e. or instance by an applied current, voltage or frequency.

The optical assembly also comprises a controlling unit which is configured to control focal length settings of the variable focal length lens by providing respective controlling signals and is configured to apply a default controlling signal for providing a default focal length and by that a default energy absorption rate (steady-state condition).

In particular, the default controlling signal is set or chosen so that a thus provided focal length of the tunable lens is between a maximum focal length and a minimum focal length applicable by the tunable lens. In particular, the default focal length is substantially in the middle of a focal length range provided by the tunable lens.

According to some aspects, the controlling unit comprises a thermal stabilisation functionality for compensating absorption of energy by a varying energy absorption rate different from the default energy absorption rate.

Due to application of a varying energy absorption rate (which is different to the default rate) the thermal energy absorbable by the variable focal length lens assembly is changing accordingly and a thermal state (temperature) of at least one component of the variable focal length lens assembly is changing. As outlined above, such a temperature change may result in further variation of the focal length due to thermal drift.

The thermal stabilisation functionality is defined by applying a varying controlling signal related to a varying focal length and applying a compensation controlling signal related to a compensating focal length, wherein either the varying or the compensation controlling signal is provided so that respectively related energy absorption rate is greater than the default energy absorption rate and the other of the varying or the compensation controlling signal is provided so that respectively related energy absorption rate is smaller than the default energy absorption rate.

In particular, the varying controlling signal is related to a focal length by which a measurement with the optical assembly should be performed. Such focal length may be set by applying the varying controlling signal and the measurement may be performed while the varying controlling signal is applied. Due to different energy absorption (different to the default energy absorption rate) a change of the thermal state of the optical assembly would occur. For compensation of such change of the thermal state the compensating controlling signal is applied to counteract the thermal change.

In particular, the thermal stabilisation functionality is defined by obtaining or determining an amount of energy absorbed by applying the varying controlling signal which provides the varying energy absorption rate and deriving a difference of thus energy absorbed relative to an energy that would have been absorbed when applying the default energy absorption rate for a corresponding (varying) time period. Based on that difference, a compensating energy absorption is derived which is defined by a compensation controlling signal and compensation duration for applying the compensation controlling signal. The compensation controlling signal and compensation duration are provided and applied to the lens assembly so that the resulting compensation energy absorption counteracts the above difference.

In other words: a varying energy absorption deviation relative to a varying default energy absorption (which would result when applying the default controlling signal for the same duration as the varying controlling signal has been applied) is provided due to application of the varying energy absorption rate. By providing the compensation energy absorption a total energy absorption deviation becomes smaller than the varying energy absorption deviation. The total energy absorption deviation corresponds to a difference between energy absorbed when applying the varying energy absorption rate for the varying time period and applying the compensation energy absorption rate for the compensation duration relative to energy that would have been absorbed when applying the default energy absorption rate for the sum of the varying time period and the compensation duration.

Again in other words, thermal stabilisation functionality is defined by obtaining at least one varying energy parameter which provides determining a varying energy absorption. The varying energy parameter may comprise at least one of a varying controlling signal, a varying energy absorption rate and a varying duration, e.g. for applying the varying controlling signal.

Based on the varying energy absorption, a varying energy absorption deviation relative to a default energy absorption is obtained or derived (e.g. calculated). The varying energy absorption deviation may be defined by energy which is absorbed due to the varying energy absorption and energy which would have been absorbed when applying the default energy absorption rate for a corresponding time period (corresponding to the varying energy absorption).

A compensation controlling signal and a compensation duration are determined, the compensation controlling signal and a compensation duration provide a compensation energy absorption. The compensation energy absorption provides a compensation energy absorption deviation relative to the default energy absorption. Again, the compensation energy absorption deviation may be defined by energy which is absorbed due to the compensation energy absorption and energy which would have been absorbed when applying the default energy absorption rate for a corresponding time period (corresponding to the compensation energy absorption).

The compensation controlling signal and the compensation duration are determined so that a total energy absorption deviation provided by the varying energy absorption and the compensation energy absorption is smaller than the varying energy absorption deviation.

In particular, the thermal stabilisation functionality can be configured to apply the controlling signal for the compensation duration to the variable focal length lens assembly.

This means, by applying the compensation signal (after providing the varying energy absorption) a differing energy consumption (differing from a respective default energy consumption) which would have exceeded or which would have been below the respective default energy consumption can be compensated for.

Application of the compensation controlling signal for the compensation duration provides applying the compensation energy absorption rate so that an average power consumption can be substantially maintained. The average power consumption may be defined by continuously applying the default controlling signal.

In particular, the varying energy absorption deviation corresponds to a difference between energy absorbed when providing the default energy absorption rate and energy absorbed when providing the varying energy absorption rate both for the same duration.

In particular, the compensation energy absorption deviation corresponds to a difference between energy absorbed when providing the default energy absorption rate and energy absorbed when providing a compensation energy absorption rate (which is different to the varying energy absorption rate) both for the same duration.

In particular, the total energy absorption deviation corresponds to a difference between energy absorbed when providing the default energy absorption rate and energy absorbed when providing the compensation energy absorption rate and the varying energy absorption rate, wherein both energy absorptions are provided for the same durations.

A total energy absorption of the lens can be defined by the sum of a first (varying) and a second (compensation) energy absorption and the total energy absorption deviation can be a difference between the total energy absorption and a default total energy absorption, the default total energy absorption can be defined by the default energy absorption rate and the sum of the first and the second duration.

In one embodiment the compensation controlling signal is applied successively after applying the varying controlling signal. In particular, the compensation controlling signal is applied immediately after applying the varying controlling signal. In another embodiment a superimposition of the compensation controlling signal and the varying controlling signal is provided, i.e. the signals are at least partially provided during the same time period, e.g. in case of providing a high frequency current (see below).

According to an embodiment the total energy absorption deviation can correspond to the sum of the varying energy absorption deviation and of the compensation energy absorption deviation. Alternatively or additionally, the compensation energy absorption deviation can correspond to a difference between energy absorbed when applying the compensation controlling signal for the compensation duration and energy absorbed when applying the default controlling signal for the compensation duration.

In one embodiment the varying energy absorption can define a varying power consumption, the compensation controlling signal and the compensation duration can provide a compensation power consumption and the compensation controlling signal and the compensation duration can be provided so that a deviation between the varying power consumption and a varying default power consumption is greater than a deviation between the total power consumption and a respective total default power consumption.

In particular, the energy absorbed by the variable focal length lens assembly may provide power consumption of the variable focal length lens and/or the actuating unit and/or a defined temperature or temperature variation of the variable focal length lens and/or the actuating unit. More particularly, each (electronic) signal which is applied to the variable focal length lens assembly can result in a signal-dependent power consumption (according to a respective time period the signal is applied) a change of an energy (and temperature/thermal) state of the assembly.

In one embodiment, the compensation controlling signal can comprise a first compensation controlling signal and a second compensation controlling signal, wherein the first compensation controlling signal is different from the second compensation controlling signal. Hence, a respective thermal compensation can be provided in steps, e.g. according to preceding measurement steps with different focal lengths.

In particular, the default controlling signal and/or the compensation controlling signal comprises a high frequency current. The default controlling signal may comprise a first default controlling signal and a second default controlling signal at least one of which may provide the high frequency current. Applying a current with a frequency $f_{HF}$ higher than a frequency which the variable focal length lens can mechanically follow, the current will cause a power consumption (and heat generation) without that the lens can mechanically following the signal. This can be used to keep the total power consumption constant if the power consumption $P_{HF}$ is chosen accordingly: $P_1 + P_{HF1} = P_2 + P_{HF2} = $ const.

$P_1 + P_{HF1}$ may be a power consumption due to application of the default focal length by applying the default controlling signal. The default controlling signal comprises a first default signal ($I_1$) and a second default signal ($I_{HF}$). $P_2$ may be the power consumption due to application of the varying controlling signal and $P_{HF2}$ may be the power consumption due to application of the compensation controlling signal which is provided as a second high frequency current.

Alternatively, $P_1$ may be a power consumption due to application of a varying focal length (differing from the default focal length) by applying a first varying controlling signal and $P_{HF1}$ may be the power consumption due to application of a second varying controlling signal which is provided as a first high frequency current. $P_2$ may be the power consumption due to application of a first compensation controlling signal and $P_{HF2}$ may be the power consumption due to application of a second compensation controlling signal which is provided as a second high frequency current.

To further minimize the impact of residual high-frequency modulation, it is beneficial to choose the exposure time $T_{exp}$ so that the average high-frequency current is zero over the exposure duration. Thus, the exposure time or HF-frequency should be chosen so that the exposure time corresponds to a whole number of HF periods, i.e. $T_{exp} = N/f_{HF}$ with N being an integer.

In an embodiment the varying energy absorption can exceed the varying default energy absorption and the compensation energy absorption can be below the compensation default energy absorption, or the varying energy absorption can be below the varying default energy absorption and the compensation energy absorption can exceed the compensation default energy absorption.

According to one embodiment, the absolute value of the compensation energy absorption deviation can be smaller than or equal to the absolute value of the varying energy absorption deviation. This means that a deviation from an average power consumption can be reduced or can even totally be compensated for.

In particular, the absolute value of the compensation energy absorption deviation can be greater than the absolute value of the varying energy absorption deviation, wherein the difference between the varying energy absorption and the varying default energy absorption comprises a different algebraic sign compared to the difference between the total energy absorption and the total default energy absorption. In such case a deviation of average power consumption can be "super"- or "over"-compensated for.

According to one embodiment, the actuating unit can comprise a voice coil or an electrode which is connected to the variable focal length lens.

A voice coil or voice-coil actuator, also known as a noncommutated DC linear actuator, is a type of direct-drive linear motor. This type of actuator consists of a permanent-magnetic-field assembly (e.g. a combination of permanent magnets and ferrous steel) and a coil assembly. The current flowing through the coil assembly interacts with the permanent magnetic field and generates a force vector perpendicular to the direction of the current. The force vector can be reversed by changing the polarity of current flowing through the coil. Non-commutated DC linear actuators can move bidirectionally, have a relatively constant force over the entire stroke, and can be used for either open- or closed-loop position or force applications.

There typically are two types of voice coils available. A moving coil actuator typically comprises a coil wound around a bobbin, which can be made from and of numerous nonmagnetic materials, and which moves in and out of a permanent-magnetic-field assembly consisting of a steel housing with a concentric permanent-magnet assembly at its centre. A moving magnet actuator provides a fixed coil and a moving magnet assembly. This construction prevents coil leads that require movement during operation. The package operates similarly to the moving-coil design, except that instead of an exposed coil that moves in and out of the magnet assembly, the moving-magnet device has a permanent-magnetic-field assembly piston that moves inside a cylindrical coil tube.

An electrode of the actuating unit may be provided in case the lens comprises a liquid which changes its chemical or optical properties as a function of an applied current. Focal length can then be varied by applying a respective current (directly) to the liquid of the lens.

In one embodiment, the at least one varying energy parameter (e.g. absorption rate and/or a varying duration) comprises or provides at least one varying controlling signal which provides the varying energy absorption rate and/or a varying duration of applying the varying controlling signal and/or a varying energy absorption rate.

Each of above parameters can provide determination of the varying energy absorption. For example, in case a time period of applying a varying signal is known or kept identical (e.g. due to keeping thermal impact moderate) an information about the current applied during this time period would be sufficient for calculating the varying energy absorption. The same applies the other way round.

In one embodiment the thermal stabilisation functionality can be defined by the following steps:

obtaining a varying controlling signal which provides the varying energy absorption rate, determining a varying duration of applying the varying controlling signal, wherein the varying energy absorption is defined by the varying energy absorption rate and the varying duration, wherein the varying default energy absorption is defined by the default energy absorption rate and the varying duration, and applying, in particular after application of the varying controlling signal, the compensation controlling signal for the compensation duration and by that providing a compensation energy absorption rate, wherein the compensation energy absorption is defined by the compensation energy absorption rate and the compensation duration, wherein the compensation default energy absorption is defined by the default energy absorption rate and the compensation duration.

In one embodiment application of the varying controlling signal for the varying duration and applying the compensation controlling signal for the compensation duration can correspond to a total energy absorption of the variable focal length lens assembly. Additionally or alternatively, the varying energy absorption deviation can correspond to a difference between energy absorbed when applying the varying controlling signal for the varying duration and energy absorbed when applying the default controlling signal for the varying duration.

As well as the compensation controlling signal, the varying controlling signal can comprise a first varying controlling signal and a second varying controlling signal, wherein the first varying controlling signal is different from the second varying controlling signal.

According to one embodiment the compensation controlling signal can be defined so that a sum of the squared values of current resulting from applying the default controlling signal (which may comprise a first and second default signal) corresponds to a sum of the squared values of current resulting from applying the varying controlling signal and the compensation controlling signal.

Referring to the approach of above a second coil can be implemented in the tunable lens which works with a voice coil, e.g. by winding an additional wire together with the wire of the first coil. The two coils can be driven with different currents $I_1$ (e.g. according to a first default signal or according to the varying controlling signal) and $I_2$ (e.g. according to a second default signal or according to the compensation controlling signal). Since the magnetic field originates from the sum and direction of currents of both coils the focus setting can be achieved by the sum of the currents including their polarity. For example if $I_1=-I_2$ the total current $I_{position}$ is zero and no magnetic field for focusing is generated. On the other hand, the power consumption is not depending on the polarity, therefore it is the same for the case $I_1=-I_2$ and $I_1=I_2$. In the second case the total current $I_{position}$ is positive, and a magnetic field is generated.

The average power consumption will be kept constant if the sum of squared currents $I_{thermal}^2=I_1^2+I_2^2$ is constant. The focus setting is possible by choosing $I_1$ (varying controlling signal) and $I_2$ (compensation controlling signal) in a way that the sum $I_{position}=I_1+I_2$ is generating the desired magnetic field.

To further improve the thermal stability, variations in the internal- or coil resistances due to e.g. temperature may be compensated for. To do this, the voltage over the coils can be measured and the current can be adapted so that not only the current, but also a power loss is constant $P_1+P_2=|U_1 I_1|+|U_2 I_2|$=constant.

In one embodiment, the thermal stabilisation functionality can provide applying of the compensation controlling signal so that the sum of thermal energy absorbed by the variable focal length lens assembly by application of the varying controlling signal and the compensation controlling signal substantially corresponds to energy absorbed by applying the default controlling signal for the sum of the varying duration and the compensation duration.

One aspect relates to a measuring device for measuring a distance to an object which device comprises at least one sensor and at least one optical element configured and arranged to provide desired propagation of light. The measuring device comprises an optical assembly according to any one of the embodiments described above and the at least one optical element comprises the variable focal length lens assembly.

The measuring device can be embodied as a coordinate measuring machine or as a geodetic surveying instrument (e.g. total station). The optical element can be configured and arranged to influence and to shape a beam of laser light emitted by a laser source of the device or may be configured and arranged to influence and/or guide light received by a light receiving unit of the device.

The disclosure also relates to a method, in particular to a computer-implemented method, for thermally stabilising a variable focal length lens assembly. The variable focal length lens assembly comprises a variable focal length lens capable of modifying its focal length and an actuating unit configured and arranged relative to the variable focal length lens so that the actuating unit provides setting and varying the focal length as a function of a controlling signal, wherein an energy absorption rate of energy absorbed by the variable focal length lens assembly depends on the applied controlling signal.

The method comprises applying a default controlling signal to the actuating unit for providing a default focal length and default energy absorption rate and applying a varying controlling signal for providing a varying focal length, the varying controlling signal provides a varying energy absorption rate different to the default energy absorption rate and by that provides a varying energy absorption deviation.

The method further comprises applying a compensation controlling signal for providing a compensation energy absorption rate, wherein the compensation controlling signal is provided so that a total energy absorption deviation resulting from applying the variance controlling signal and the compensation controlling signal is smaller than the varying energy absorption deviation.

The disclosure also relates to a computer programme product comprising programme code which is stored on a machine-readable medium, or being embodied by an electromagnetic wave comprising a programme code segment, and having computer-executable instructions for performing the method of above, in particular when executed on a controlling unit of an optical assembly according to any one of the embodiments described above.

BRIEF DESCRIPTION OF THE DRAWINGS

The method and the device are described or explained in more detail below, purely by way of example, with reference to working examples shown schematically in the drawings. Specifically.

DETAILED DESCRIPTION

Figure 1:
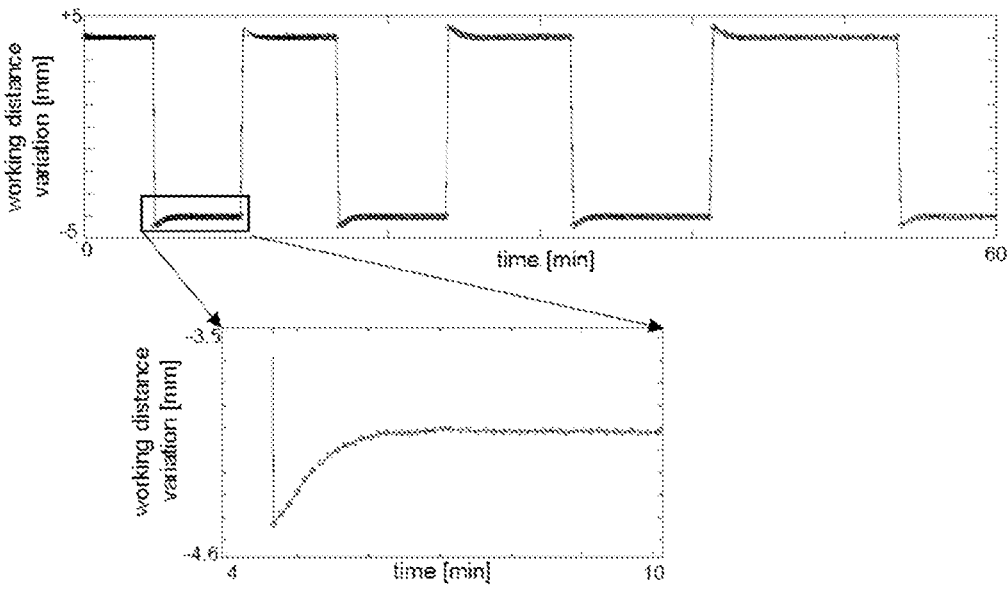
FIG. 1 shows a change of working distance as a function of applying respective controlling signals.
Figure 2A:
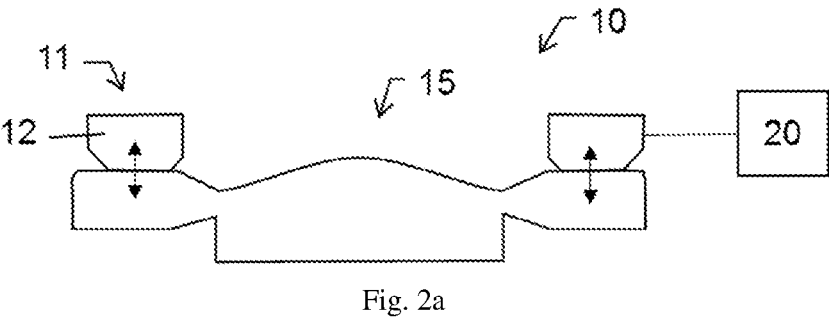
FIGS. 2a-b show an embodiment of a variable focal length lens assembly.
Figure 2B:
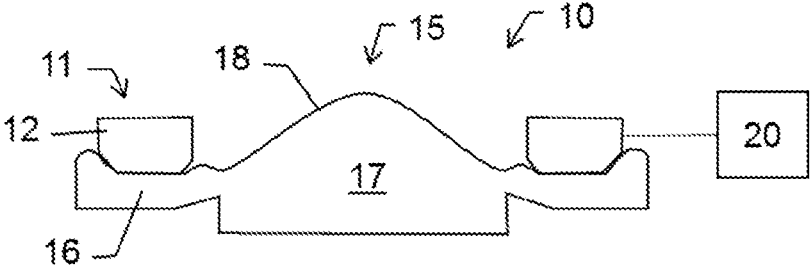

FIGS. 2a and 2b show a crosscut view of an embodiment of variable focal length lens assembly 10 (tunable lens).

An actuating unit 11 is mounted to on a variable focal length lens 15. The actuating unit 11 comprises actuating members 12 which are capable of applying a force or pressure to lens according to the directions shown by arrows. FIG. 2a shows the variable focal length lens assembly 10 in a particular first focusing position.

The actuating members 12 are provided by a voice coil actuator and can be moved according to respective application of a defined current to the voice coil. I.e. the force applied to the lens can be reduced or increased.

FIG. 2b shows the variable focal length lens assembly 10 in state of increased actuation force. The provided optical power is increased accordingly. As can be seen, the actuating element 12 is provided to apply an increased force to the outer part 16 of the lens. Such increased pressure results in pressing a fluid 17, which is enclosed inside of the lens by means of a flexible membrane 18, out of the outer part 16 into a central region of the lens. By that, the volume of the central part of lens is increased and a curvature of the boundary surface of the lens increases accordingly.

The downward movement of the actuating member is provided by varying a respective controlling signal to the actuating unit 11. The controlling signal is provided by a controlling unit 20. With changing the controlling signal (e.g. an applied current or voltage) the amount of (thermal) energy consumed or absorbed for a defined time period by the variable focal length lens assembly 10 varies. By that, a thermal state or temperature of the variable focal length lens assembly 10 is influenced accordingly. Compensation of such influence is subject to and described in more detail below with FIGS. 3a-d and also above.

Again in other words: the membrane 18 comprises an elastic or shape-changing polymer. The fluid 17 which forms the lens contains an optical fluid, which is sealed off with the elastic shape-changing polymer membrane. The electromagnetic actuator 11 provides to exert pressure on the container 16 and therefore changes the curvature of the lens. By changing the electrical current flowing through the voice coil 11, the optical power of the lens 15 can be controlled.

Tuning of the focal length of the lens can be provided within very few milliseconds due to applying an electrical current.

The variable focal length lens assembly 10 can be designed to provide "push pull" characteristic which means that the lens curvature can be deflected from concave to convex.

A voice coil may provide reduction of a lag of temperature measurement at the lens. It can be beneficial to measure temperature as close as possible to the lens itself. One opportunity would be to use the voice coil itself as a thermistor. Either by time-multiplexing drive current and temperature sensing using the same coil, or alternatively by integrating a second coil which could be used for sensing in parallel to the first coil. To avoid magnetic induced voltage from the first drive coil it may in that case help to reverse the second coil halfway so that it has net zero windings.

In another embodiment the second coil does not have to be reversed halfway. The second coil can be embodied as a regular one-way coil acting in an opposite direction to the primary coil, and the "net zero" effect can be achieved by changing (increasing) the current in the primary coil. By that, it becomes possible to increase the power loss, not to decrease it. The default energy absorption rate thus may be related to the maximum current of the primary coil. The second coil can then be used to increase the power loss for smaller actuation forces.

If the in-coil temperature sensing reacts faster than the optical change of focus, the so measured temperature signal could be delayed and low-pass-filtered to match the thermal dynamics of the lens.

As already mentioned above, the variable focal length lens assembly 10 is proposed for more precise measuring purposes and for integration in (multi-sensor) CMM.

Accordingly, the variable focal length lens assembly 10 can be advantageous when performing coordinate measurement with an image stack. An image stack is formed when a number of images at different focus settings (and therefore working distances) are acquired. The lens setting corresponding to the sharpest image of an object feature enables the calculation of the working distance and finally the x, y, z coordinates of the feature. For this the knowledge of the ambient temperature and the temperature-dependent calibration function can also be considered. As a measure for the sharpness the image contrast can be processed or the steepness of the transition from dark to bright image features.

As a further improvement of the coordinate measurement method described above not only the image with the highest contrast can be selected but the maximum contrast can be determined by fitting a function to the contrast values vs. the lens signal and determining the maximum of it.

A further advantage of using the optical assembly concerns relative measurements. In some applications not the absolute x,y,z coordinate of an object feature but the relative coordinates or the distance with respect to another object feature is of interest, e.g. a step height. Preferably, both these features are in the range of a z-scan provided by the tunable lens and in one field of view (FOV), i.e. no re-positioning of the CMM probe is required, the relative distance can be determined very fast and with highest accuracy. Inaccuracies related to the absolute position of a telecentric lens and the whole measurement system (repositioning of a probe or its lens) fall out of the calculation, i.e. do not influence the measurement.

A further advantage of using the optical assembly relates to acquire an "always-sharp-image". When performing a z-scan, features at different z-distances are focused one after the other. The features which are at the time not in focus are blurred. An always-sharp-image can be calculated from the image stack by selecting that parts of the images which are in focus and combine them to a new image. Using the variable focal length lens assembly 10 provides continuous acquisition of an always-sharp-image without causing a temperature drift.

Furthermore, some CMMs provide positioning of the imaging system not only in x,y,z directions but also in one or more rotation axes. Such an element of a (multi-sensor) CMM is known as a wrist. This allows the imaging system to be moved and positioned in 5 DoF, which enables very flexible use of the device (the 6th degree is the rotation around the optical axis, which offers little advantage). Due to comparatively compact design of a variable focal length lens assembly 10, a combination with a CMM wrist can be realised in respective advantageous (simple) manner.

FIGS. 3a to 3d show embodiments of compensations of power consumptions according to different operation modes. The operation modes can be applied to a variable focal length lens assembly according to FIGS. 2a and 2b.

To overcome the settling effect of the lens (see above) after a change of the focus tuning the lens can be operated continuously in a state with constant average power consumption. When the lens focus is changed for a measurement (varying focal length) this can be done quickly and with subsequent or preceding compensation of the energy or power consumption (compensation focal length), in particular immediately, afterwards or before.

Figures 3A, 3B:
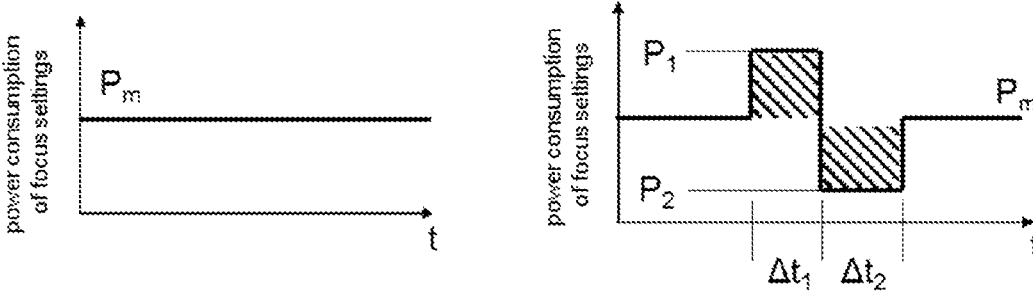
FIGS. 3a-d show different operation modes for a variable focal length lens assembly.

FIG. 3a shows an energy or power consumption according to a default operation mode while applying the default controlling signal to the lens assembly. Such mode may be a stand-by mode of a respective measuring machine (like a CMM) during which no measurement is to be performed. The lens is set to a defined (default) focus state, e.g. in the middle of the working range of the lens. The power consumption $P_m$ is constant.

For performing a measurement the lens can be set to another focus state for providing desired focal length of the lens. This is done by applying the varying controlling signal for a time much shorter than the settling time (see above) of the lens. An image can be acquired while providing the desired focal length and afterwards the lens is set to another (compensation) focus state by applying the compensation controlling signal for e.g. the same duration (FIG. 3b). The second (compensation) focus state is chosen so that the power consumption of the varying measuring state $P_1$ is compensated with the power consumption of the compensation state $P_2$. If the duration t was different in state 1 and 2 the different durations can be taken into account by $P_1$ $t_1 + P_2 t_2 = P_m (t_1 + t_2)$. With other words, the energy consumption is compensated to become the same like in the default mode of the same duration. The compensation controlling signal (and duration of its application) is determined and applied respectively. The durations $t_1$ and $t_2$ are much shorter than the settling time, typically $t_1 + t_2 < 1$ sec.

Figures 3C, 3D:
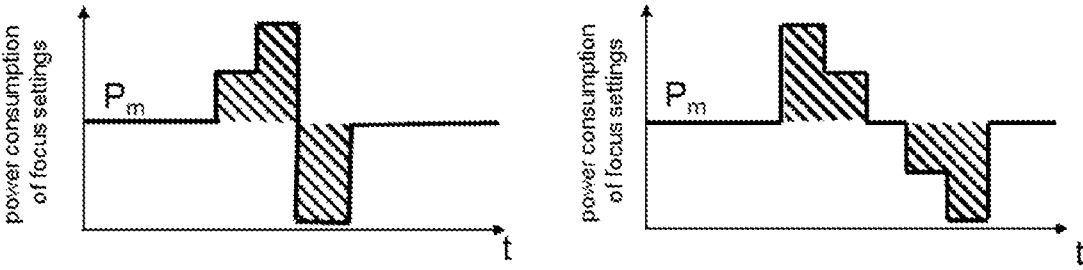

According to another operation of the variable focal length lens assembly, the lens can be controlled to perform a series of focus states (e.g. in order to determine the distance to the object) by applying a series of varying controlling signals. These different focus states can be followed with an additional setting of a compensating focus state to compensate the energy consumption by applying a respective compensation controlling signal (FIG. 3c). Application of the compensation controlling signal (level and duration) is defined so that an area enclosed by a deviating power level (deviating from $P_m$) and the compensation duration corresponds to an area enclosed by a deviating power level of the varying controlling signals and the varying duration(s).

The compensation focus state can also be broken down into multiple compensating focus states which allow the series to be continued while maintaining thermal equilibrium (FIG. 3d). Again, the enclosed areas correspond to each other. The whole sequence preferably is (much) shorter than the settling time of the lens.

Figure 4:
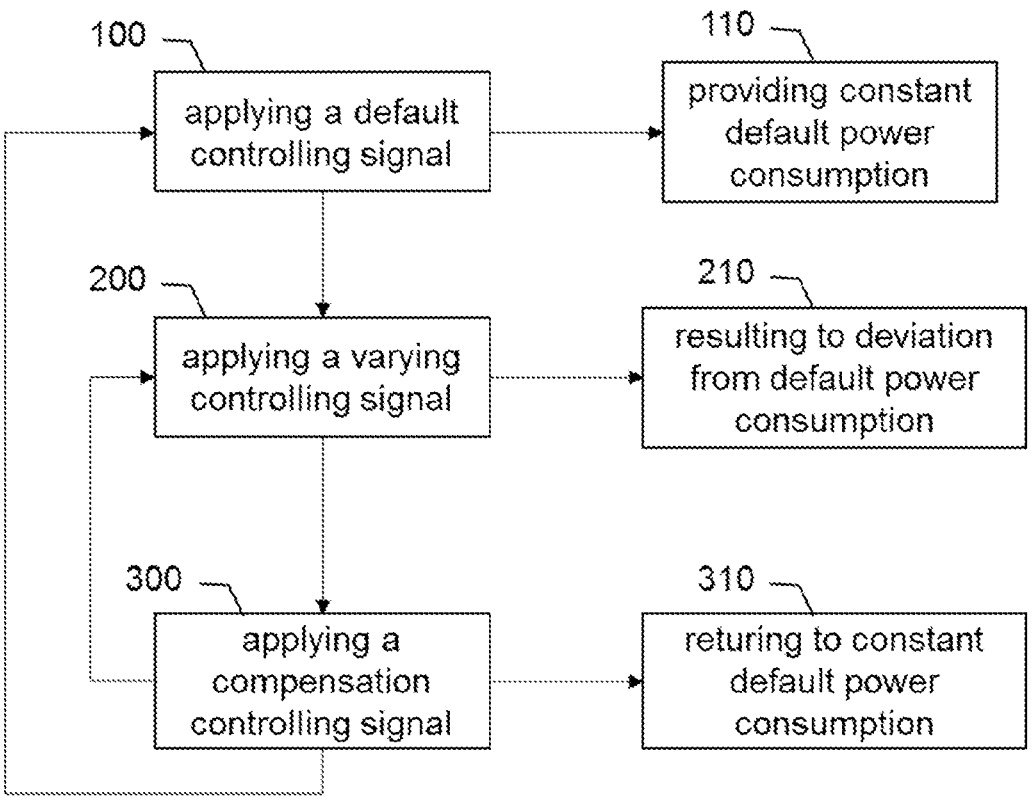
FIG. 4 shows a work flow for a method.

FIG. 4 shows an embodiment of a work flow of a method.

The method provides with step 100 applying of a default controlling signal which provides a constant default energy or power consumption (110). For instance, for performing a desired measurement by means of the optical assembly a defined varying controlling signal is applied (step 200).

Such defined varying controlling signal provides a desired different focal length of the tunable lens and by that a deviation from the default power consumption (210). The deviating power consumption results to a change of thermal state (temperature) of the variable focal length lens assembly which may cause a drift of the focal length (settling of the lens).

In order to avoid the settling and to stabilise the optical properties (focal length) of the lens a compensation controlling signal is applied (step 300). The compensation controlling signal provides application of a different compensation power consumption which (seen together with the deviating power consumption of applying the varying controlling signal) provides a return to the constant default power consumption.

As a total result, an average energy (power) consumption of the lens assembly can be kept constant which provides a constant temperature of the assembly. Particular settlings of the lens can be avoided.

Concerning a particular application of above measuring method, the lens may first be positioned in a steady-state at a mean focal distance of 90 mm (default controlling signal). A user wants to measure an object in the target distance range 91 to 93 mm Hence, the lens is tuned to a focal distance of 93 mm (varying controlling signal). In a next step, the focal distance is changed stepwise by e.g. 100 µm from 93 mm to 91 mm. At each step an image is taken with the camera. For thermal compensation, the lens tuning then continues, without taking camera images, in steps until 87 mm Afterwards, the lens is tuned back to steady-state position 90 mm.

Although aspects are illustrated above, partly with reference to some specific embodiments, it must be understood that numerous modifications and combinations of different features of the embodiments can be made and that the different features can be combined with each other or with coordinate measuring machines known from prior art.

The invention claimed is:

1. An optical assembly comprising
  a variable focal length lens assembly comprising
    a variable focal length lens capable of modifying its focal length and
    an actuating unit configured and arranged relative to the variable focal length lens
    so that the actuating unit provides setting and varying the focal length as a function of a controlling signal,
  wherein an energy absorption rate of energy absorbed by the variable focal length lens assembly depends on the applied controlling signal, and
  a controlling unit configured
    to control focal length settings of the variable focal length lens by providing respective controlling signals, and
    to apply a default controlling signal for providing a default focal length and default energy absorption rate,
  wherein the controlling unit provides a thermal stabilisation functionality for compensating absorption of energy with a varying energy absorption rate different from the default energy absorption rate, the thermal stabilisation functionality is defined by
  applying a varying controlling signal related to a varying focal length and
  applying a compensation controlling signal related to a compensating focal length, wherein either the varying or the compensation controlling signal is provided so that respectively related energy absorption rate is greater than the default energy absorption rate and the other of the varying or the compensation controlling signal is provided so that respectively related energy absorption rate is smaller than the default energy absorption rate, wherein the default controlling signal and the compensation controlling signal comprises a high frequency current higher than a frequency which the variable focal length lens can mechanically follow and a superimposition of the compensation controlling signal and the varying controlling signal is provided.

2. The optical assembly according to claim 1, wherein the thermal stabilisation functionality is defined by obtaining at least one varying energy parameter which provides determination of a varying energy absorption, obtaining, based on the varying energy absorption, a varying energy absorption deviation, and determining a compensation controlling signal and a compensation duration which provide a compensation energy absorption, the compensation energy absorption provides a compensation energy absorption deviation, wherein the compensation controlling signal and the compensation duration are determined so that a total energy absorption deviation provided by the varying energy absorption and the compensation energy absorption is smaller than the varying energy absorption deviation.

3. The optical assembly according to claim 2, wherein the total energy absorption deviation corresponds to the sum of the varying energy absorption deviation and of the compensation energy absorption deviation, and/or the compensation energy absorption deviation corresponds to a difference between energy absorbed when applying the compensation controlling signal for the compensation duration and energy absorbed when applying the default controlling signal for the compensation duration.

4. The optical assembly according to claim 2, wherein the varying energy absorption defines a varying power consumption ($P_1$), the compensation controlling signal and the compensation duration provide a compensation power consumption ($P_2$) and the compensation controlling signal and the compensation duration are provided so that a deviation between the varying power consumption and a varying default power consumption is greater than a deviation between a total power consumption and a respective total default power consumption ($P_m$).

5. The optical assembly according to claim 2, wherein the varying energy absorption exceeds a varying default energy absorption and the compensation energy absorption is below a compensation default energy absorption, or the varying energy absorption is below the varying default energy absorption and the compensation energy absorption exceeds the compensation default energy absorption.

6. The optical assembly according to claim 2, wherein:

the absolute value of the compensation energy absorption deviation is smaller than or equal to the absolute value of the varying energy absorption deviation, and/or the absolute value of the compensation energy absorption deviation is greater than the absolute value of the varying energy absorption deviation, wherein the difference between the varying energy absorption and the varying default energy absorption comprises a different algebraic sign compared to the difference between a total energy absorption and a total default energy absorption.

7. The optical assembly according to claim 2, wherein the at least one varying energy parameter comprises at least one of the following:

a varying controlling signal which provides the varying energy absorption rate, a varying duration of applying the varying controlling signal, and the varying energy absorption rate.

8. The optical assembly according to claim 1, wherein the compensation controlling signal comprises a first compensation controlling signal and a second compensation controlling signal, wherein the first compensation controlling signal is different from the second compensation controlling signal, and/or the varying controlling signal comprises a first varying controlling signal and a second varying controlling signal, wherein the first varying controlling signal is different from the second varying controlling signal.

9. The optical assembly according to claim 1, wherein the actuating unit comprises a voice coil or an electrode which is connected to the variable focal length lens.

10. The optical assembly according to claim 1, wherein the thermal stabilisation functionality is defined by:

obtaining the varying controlling signal which provides the varying energy absorption rate, determining a varying duration of applying the varying controlling signal, wherein the varying energy absorption is defined by the varying energy absorption rate and the varying duration, wherein the varying default energy absorption is defined by the default energy absorption rate and the varying duration, applying, after application of the varying controlling signal, the compensation controlling signal for a compensation duration and by that providing a compensation energy absorption rate, wherein the compensation energy absorption is defined by the compensation energy absorption rate and the compensation duration, wherein a default compensation energy absorption is defined by the default energy absorption rate and the compensation duration.

11. The optical assembly according to claim 10, wherein the thermal stabilisation functionality provides applying of the compensation controlling signal so that the sum of thermal energy absorbed by the variable focal length lens assembly by application of the varying controlling signal and the compensation controlling signal substantially corresponds to energy absorbed by applying the default controlling signal for the sum of the varying duration and the compensation duration.

12. A measuring device for measuring a distance to an object comprising at least one sensor and at least one optical element configured and arranged to provide desired propagation of light, wherein the measuring device comprises an optical assembly according to claim 11 and the at least one optical element comprises the variable focal length lens assembly.

13. The optical assembly according to claim 1, wherein the compensation controlling signal is defined so that a sum of the squared currents resulting from applying the default controlling signal corresponds to a sum of the squared currents resulting from applying the varying controlling signal and the compensation controlling signal.

14. A measuring device for measuring a distance to an object comprising at least one sensor and at least one optical element configured and arranged to provide desired propagation of light, wherein the measuring device comprises an optical assembly according to claim 1 and the at least one optical element comprises the variable focal length lens assembly.

15. A method for thermally stabilising a variable focal length lens assembly which comprises:

a variable focal length lens capable of modifying its focal length and an actuating unit configured and arranged relative to the variable focal length lens so that the actuating unit provides setting and varying the focal length as a function of a controlling signal, wherein an energy absorption rate of energy absorbed by the variable focal length lens assembly depends on the applied controlling signal, wherein the method comprises applying a default controlling signal to the actuating unit for providing a default focal length and default energy absorption rate and applying a varying controlling signal for providing a varying focal length, the varying controlling signal provides a varying energy absorption rate different to the default energy absorption rate and by that provides a varying energy absorption deviation, wherein applying a compensation controlling signal for providing a compensation energy absorption rate, wherein the compensation controlling signal is provided so that a total energy absorption deviation resulting from applying the variance controlling signal and the compensation controlling signal is smaller than the varying energy absorption deviation, wherein the default controlling signal and the compensation controlling signal comprises a high frequency current higher than a frequency which the variable focal length lens can mechanically follow and a superimposition of the compensation controlling signal and the varying controlling signal is provided.

16. A computer program product comprising program code which is stored on a non-transitory machine-readable medium, and having computer-executable instructions for performing, when executed on a controlling unit of an optical assembly, the method according to claim 15.

* * * * *